April 19, 1949.                    P. R. LEE                       2,467,896
                    THERMOSTATIC CONTROL AND INDICATING DEVICE
Filed May 30, 1942                                              3 Sheets-Sheet 1
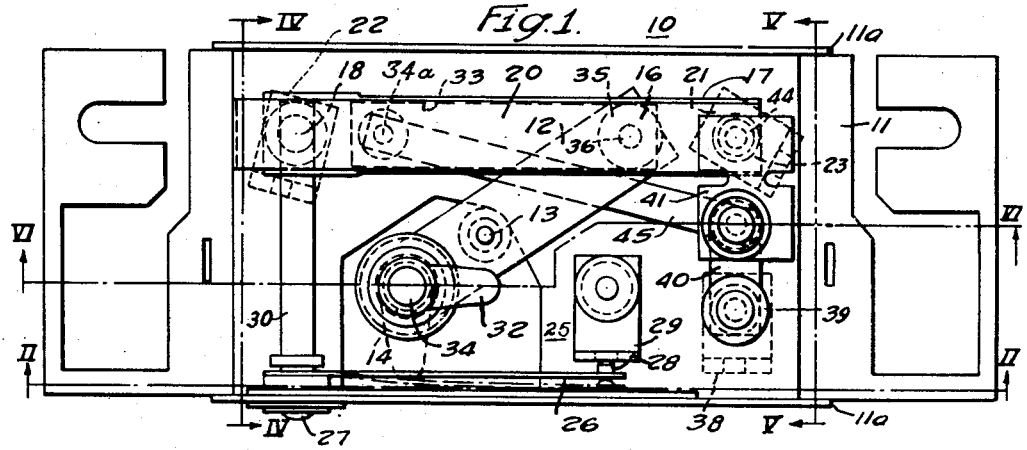
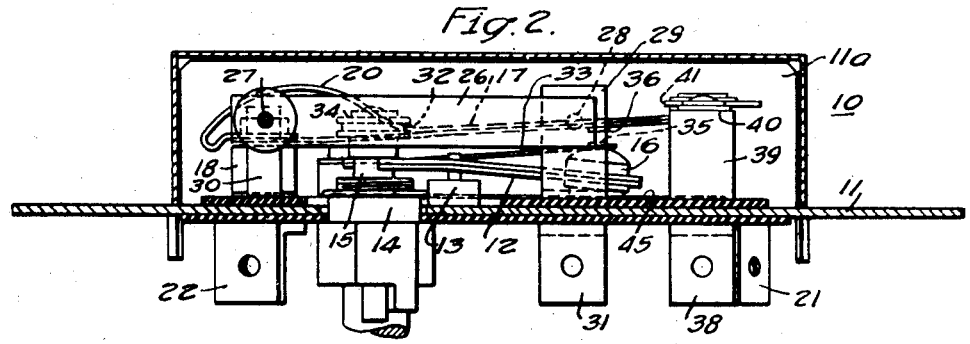
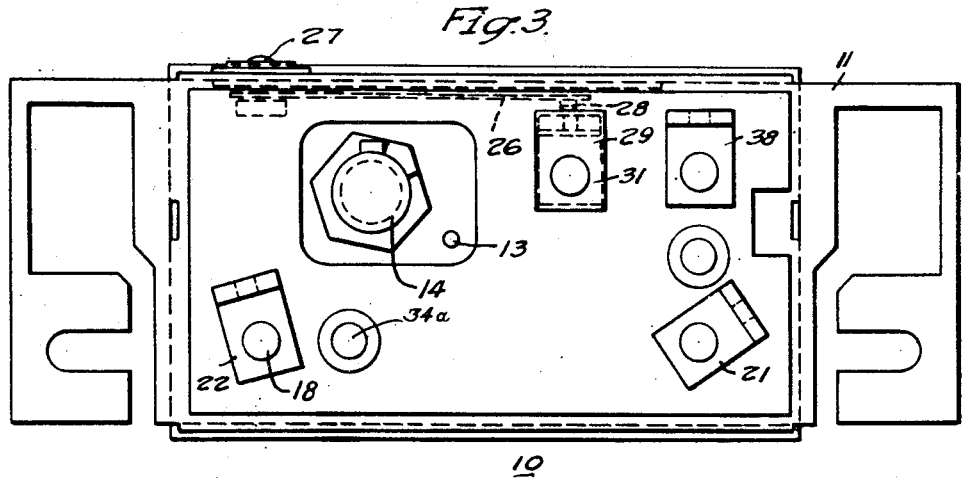
WITNESSES:                                          INVENTOR
                                                    Paul R. Lee.
                                                    BY
                                                    ATTORNEY.

April 19, 1949. P. R. LEE 2,467,896
THERMOSTATIC CONTROL AND INDICATING DEVICE
Filed May 30, 1942 3 Sheets-Sheet 2
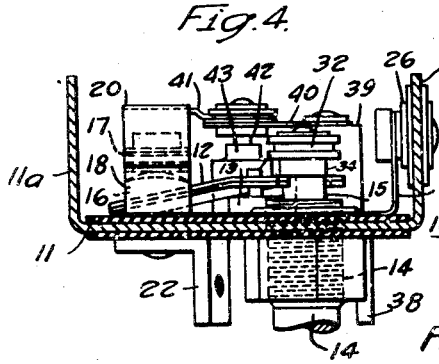
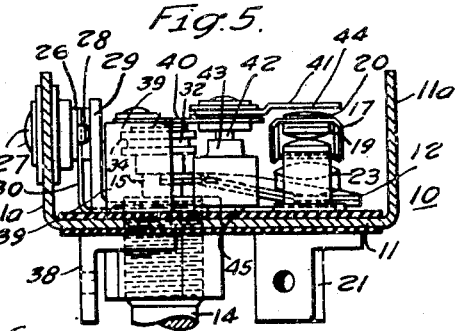
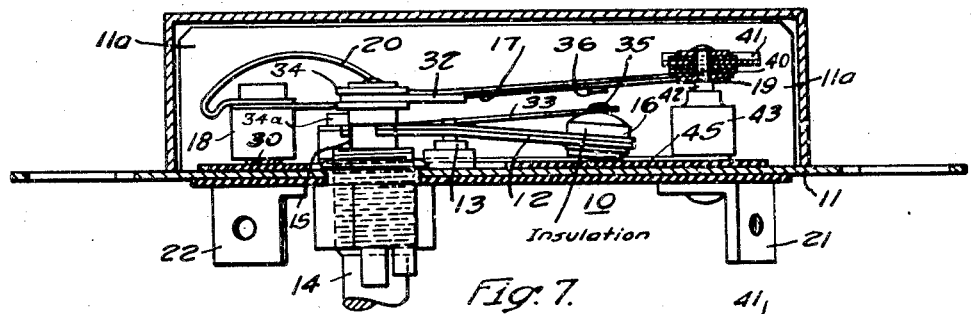
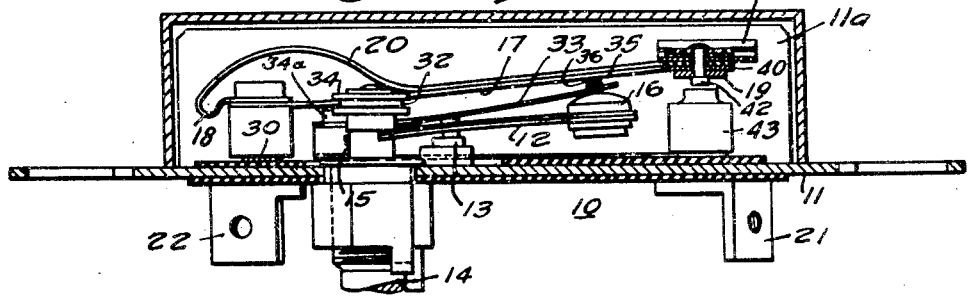
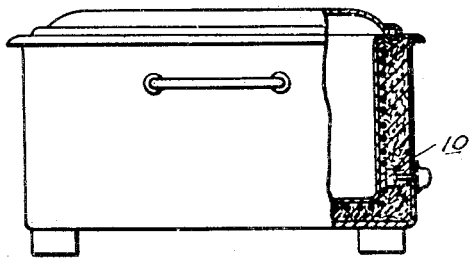
INVENTOR
Paul R. Lee.
BY
W. R. Coley
ATTORNEY April 19, 1949.   P. R. LEE   2,467,896
THERMOSTATIC CONTROL AND INDICATING DEVICE
Filed May 30, 1942   3 Sheets-Sheet 3

WITNESSES:
E. A. McCloskey
H. E. Hepler

INVENTOR
Paul R. Lee.
BY
W. R. Coley
ATTORNEY

Patented Apr. 19, 1949

2,467,896

UNITED STATES PATENT OFFICE 2,467,896

THERMOSTATIC CONTROL AND INDICATING DEVICE

Paul R. Lee, Mansfield, Ohio, assignor to Westinghouse Electric Corporation, East Pittsburgh, Pa., a corporation of Pennsylvania Application May 30, 1942, Serial No. 445,165

1 Claim. (Cl. 177—311)

My invention relates to electrically heated appliances, and more particularly to temperature control and indicating devices for such appliances.

While the invention embodied herein is particularly adapted for use with electrical appliances and is described as being applied to an electrically heated roaster, it will be apparent to those skilled in the art that its use is not limited to such an application.

Electrically heated roasters and other appliances have utilized manually adjustable thermostats for selectively determining the temperature of operation of such devices. In addition, indicating devices have been associated with the thermostat and heating element to indicate various phases of energization of the device. However, in no case has there been a thermostatic structure which embodies control features for operating a signaling means which would indicate when the device being controlled is connected to a suitable power supply and an additional signaling means for indicating when the device is at or within the determined temperature range, as selected by an operator.

It is therefore an object of my invention to provide a thermostatic structure embodying circuit control means for operating a signal so as to indicate when the device is connected to a suitable power supply, as well as control means for indicating when the device is below its predetermined operating temperature and when above its operating temperature.

A further object of my invention is to provide a thermostatic structure with an auxiliary make and break circuit-controlling device which is actuated by the thermostatic control adjusting means so as to actuate a signal when the thermostat is turned to an "on" position, providing there is a suitable power supply associated therewith.

Another object of my invention is to provide a thermostat for an electrical roaster, or the like, embodying a thermally responsive element which flexes with changes in temperature of the device so as to regulate the power supplied to the heating element of said device and to actuate control means for energizing a signal to indicate that the device is at its proper temperature.

Still a further object of my invention is to provide a thermostat for an electrical roaster, or the like, having an auxiliary or second contact-carrying arm positioned intermediate a thermally responsive element and a main contact arm so as to be moved into engagement with the main contact arm, prior to any movement of said contact arm, to energize a signal to indicate that the roaster device, or the like, has arrived at the predetermined selected operating temperature.

Still another object of my invention is to provide a thermostat for a roaster, or the like, having an auxiliary contact structure engageable by the main contact arm so as to interrupt a signal circuit to indicate when the roaster temperature is above the predetermined set value.

Other objects of my invention will either be pointed out specifically in the course of the following description of the device embodying my invention, or will be apparent from such description, reference being made to the accompanying drawings, in which:

Figure 1 is a top plan view of a thermostat embodying my invention with the cover removed therefrom;

Fig. 2 is a view taken along the line II—II of Fig. 1 with the cover in position;

Fig. 3 is a bottom view of the thermostatic structure shown in Fig. 1;

Figs. 4 and 5 are sectional views taken along the lines IV—IV and V—V of Fig. 1, respectively;

Fig. 6 is a sectional view, taken along the line VI—VI of Fig. 1, indicating the movable parts of the thermostat in its cold or initial operating position;

Fig. 7 is a view similar to Fig. 6 with the movable operating parts of the thermostat in its fully heated or deenergized position;

Fig. 8 is an end view of a roaster partially in section having the thermostatic structure embodying my invention associated therewith;

Fig. 10 is a schematic wiring diagram illustrating a thermostat embodying my invention associated with a roaster or the like.

Figure 9:
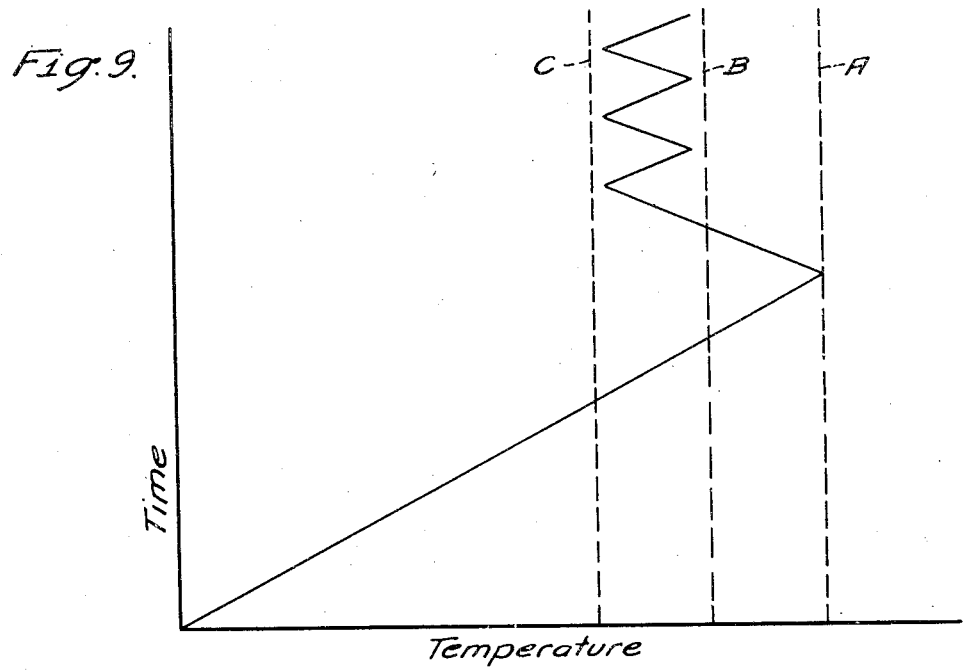
Fig. 9 is a time-temperature curve illustrating the temperature characteristics of a controlled device, such as a roaster, and the operation of the signals embodying my invention.

Referring to the accompanying drawings, in which like reference characters indicate like parts in the several drawings, there is shown a thermostatic structure 10 which has been designed primarily for operation with a roaster structure. However, said thermostatic structure 10 and the sub-combinations thereof may be used with or in any other desired device. It will be noted from the accompanying drawings that I have not illustrated a roaster per se (except in Fig. 8), inasmuch as it is believed unnecessary to include all the parts of such a structure in the drawings. However, it is to be understood that the said thermostat is primarily adapted for use within a roaster structure, or the like.

The thermostat 10 embodying my invention is primarily an improvement over the thermostatic structure disclosed and claimed in a copending application of E. K. Clark and P. R. Lee, Serial No. 206,329, filed May 6, 1938, and assigned to the assignee of this invention, which issued as Patent No. 2,298,928 on October 13, 1942. The thermostat disclosed therein may be generally described as follows:

A substantially horizontal support 11 having upstanding sides 11a has a bimetallic element member 12 fulcrumly positioned thereupon by means of a fulcrum 13 which is rigidly attached to said support. An adjusting screw 14 having an undercut portion 15 within its inner end is adapted to fit within a notched or cutout portion of one end of the bimetallic element 12 whereby said adjusting screw 14 may change the angular position of said thermal responsive element 12 so as to vary its operating characteristics. The free end of said bimetallic element 12 has rigidly attached thereto an insulating button-like member 16 which is adapted to engage other working parts of the thermostat to control the energization of the circuit passing therethrough. A main contact arm 17 is rigidly attached by means of one end thereof to the support 11 by means of an upstanding supporting member 18 and carries upon its other end a main movable contact 19. In addition, a flexible current-carrying member 20 is folded back over the arm 12 to carry the greater portion of current flowing through the thermostat 10. This flexible member 20 is attached to the arm support 18 at one end and to the main movable contact 19 at its other end. Suitable terminal members 21 and 22 are rigidly attached to both the main arm support member 18 and to a stationary contact support 23, respectively, to provide means for connecting the thermostat 10 in series with the roaster heating element 24 (see Figs. 8 and 10). This type of thermostat, as set forth in the above-identified patent, may be positioned within a roaster structure (as in Fig. 8) so as to maintain the temperature thereof in keeping with established practice. Specifically, as the temperature increases, the bimetallic thermal responsive element 12 flexes upwardly, whereby the insulating button 16 positioned upon the free end thereof engages the main arm 17 intermediate its ends so as to bodily move said arm 17 and disengage the cooperating main contacts 19 and 23 so as to deenergize the roaster, or the like.

In order to provide suitable signaling means to indicate when the roaster structure, or the like, is energized and to indicate when such structure is at its preselected temperature, I utilize the following structures.

A power-on signal 25 (see Fig. 1) is energized through a switch spring member 26 rigidly attached at one end thereof to a side 11a of the thermostatic support or housing 11 by means of a suitable rivet structure 27. A movable contact 28 is rigidly attached to the free end of said switch member 26 so as to engage a stationary contact 29 rigidly attached to the support 11. The switch spring 26 is adapted to bias the movable contact 28 into engagement with the stationary contact 29 so as to enable cooperative engagement therewith at all times when the thermostat adjusting member or screw 14 is in its "off" position. A connector 30 joins the main contact arm terminal 22 and support 18 at one end and the rigid and stationary end of the switch spring 26 at its other end. This provides a circuit from the power terminal 22 of the main contact arm 17 through the connector switch spring 26, movable contact 28, stationary contact 29 and a power indicator terminal 31.

The adjusting screw or device 14 has an outwardly extending cam-like finger or protuberance 32 insulatedly attached to the inner end thereof. The protuberance or finger 32 is adapted to engage the switch spring arm 26 when the adjusting screw 14 is moved to a power-off position. As the cam-like finger 32 moves into a power-on position, the switch spring member moves in a counterclockwise direction as seen in Fig. 1. The movable contact 28 is, therefore, engaged with the stationary power indicating contact 29. The power signal means 25 is, therefore, energized, indicating that the heating element 24 of the roaster, or the like, is being energized or is connected to a suitable power supply. It follows that as the adjusting screw 14 of the thermostatic structure 10 is returned to an "off" position so as to deenergize or disconnect the roaster heating element, the switch spring contact arm 26 returns to a contact disengaged position so as to deenergize the power signal means (see dotted lines Fig. 1).

Adjusting screw 14 also effects the opening of the circuit to the heating element 24 when in the "off" position.

Figures 2, 6 and 7 clearly show that a shoulder exists on the screw 14, close to the end of the screw (above undercut portion 15). This shoulder pushes against bimetal 12. Therefore, as screw 14 is turned, it raises or lowers this end of bimetal 12. When it does, the bimetal simply rocks or rotates about fulcrum 13. This changes the operating temperature of the thermostat because it changes the gap between the insulating pin 16 and spring 17.

As screw 14 is turned counterclockwise, this gap reduces. This means the bimetal 12 has to be heated to a lower temperature than before in order to engage spring 17 and cause contacts 19 and 23 to separate. Separation of these contacts opens heater circuit 24 in Fig. 10, causing the roaster to cool in temperature. When it cools a few degrees, bimetal 12 deflects in an opposite direction to that on heating and causes contacts 19 and 23 to reclose again.

Figure 10:
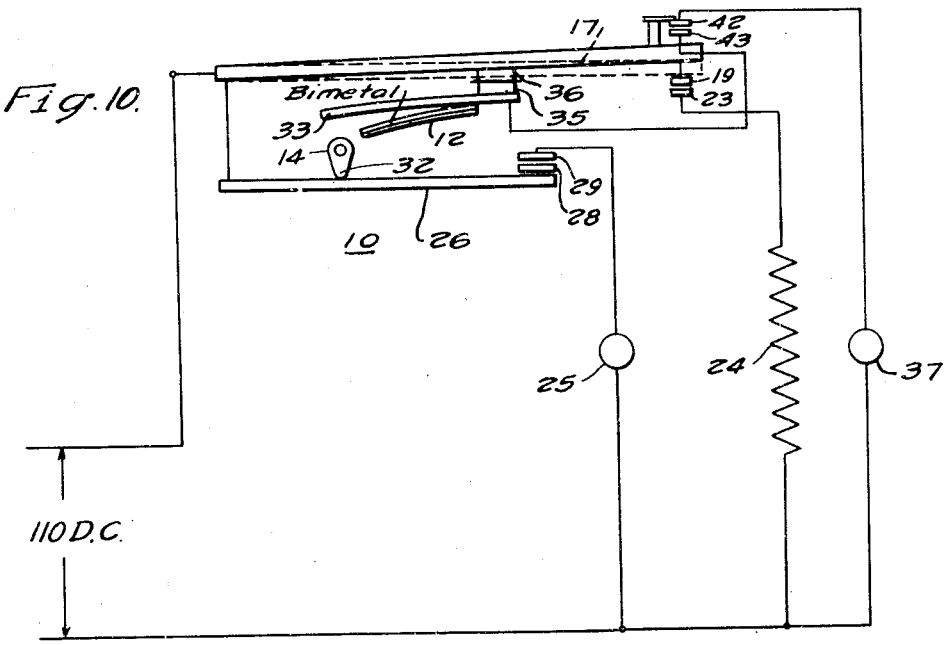

The thermostat is so designed that when screw 14 is turned counterclockwise, the operating temperature of the thermostat is reduced. As the screw 14 approaches its extreme counterclockwise position, it pushes on bimetal 12 with sufficient force to cause the main contacts, 19 and 23, to separate and thereby open the circuit to the heating element 24. Cam 32 is so positioned on screw 14 as to start to open contacts 28 and 29 at this same instant. It does this by pressing on spring 26 as shown in Fig. 10.

A temperature signal means 37, such as an electric light, is energized or deenergized in the following manner: The signal means 37 is connected in series with the "under-temperature" contacts 35 and 36, which, at room temperature, are open or disengaged and the "over-temperature" contacts 42 and 43, which, at room temperature, are closed or engaged, as is hereinafter more fully set forth.

An "under-temperature" contact arm 33 is positioned substantially in line with and beneath the main contact arm 17. Said arm is rigidly attached to and insulated from the support 11 by means of a suitable upstanding rivet-like structure 34a. The "under-temperature" contact arm 33 is formed of a resilient material and is arranged so as to flex or be biased downwardly or in a clockwise direction. The "under-temperature" contact arm 33 has the movable contact 35 rigidly attached to the upper surface of its free end portion. The free end of said contact arm 33 is located substantially above the free end of the thermally responsive element 12 whereby the insulating button 16 attached thereto is adapted to engage the lower portion of said arm. It therefore follows that, as the thermal responsive element 12 flexes upwardly with an increasing temperature, the insulating button 16 attached thereto and movable therewith moves the under contact arm 33 upwardly.

The "stationary" "under-temperature" contact 36 is rigidly attached to the lower surface of the main contact arm 17 so as to be engaged by the movable "under-temperature" contact 35 rigidly attached to the free end of the "under-temperature" arm 33 as said arm is moved into an upper position by the thermally responsive element 12.

With the thermostat 10 at room temperature, or at a temperature substantially below that at which the thermostat is set to operate, the free end of the thermal responsive element 12 will be in a low position. The movable end of the "under-temperature" contact arm 33 will accordingly be in a low position (see Fig. 6) with the movable contact 35 attached thereto separated or disengaged from the "stationary" contact 36 carried by the main contact arm 17. Then, as the temperature increases, the bimetallic element 12 flexes in a counterclockwise direction, moving the free end of said element 12 upwardly.

The "under-temperature" contact arm 33 likewise moves upwardly in a counterclockwise direction. This movement continues until at a time just prior to the opening of the main contacts 19 and 23 when the "under-temperature" movable contact 35 engages the "stationary" "under-temperature" contact 36 carried by arm 17. This engagement of the "under-temperature" contacts 35 and 36 thus closes a circuit to the temperature signal means 37, energizing said means so as to indicate that the roaster, or the like, is at the desired operating temperature.

It follows that, with a continued movement of the bimetallic element 12, the main contact arm 17 will be likewise moved upwardly so as to separate the main contacts 19 and 23 and deenergize the roaster heating element 24. A continued intermittent operation of the main elements follows, in keeping with established practice, so as to maintain the roaster at its predetermined temperature. However, during such intermittent operation of the main contacts 19 and 23 and of the bimetallic element 12, the "under-temperature" contacts 35 and 36 remain in an engaged position.

A suitable "over-temperature" structure is associated with the main contact arm 17 so as to indicate when the roaster, or the like, is at a temperature substantially above that desired. The "over-temperature" structure embodies a terminal 38 and upstanding supporting post 39, a flexible or resilient contact-carrying member 40, and an insulated outwardly extending finger-like member 41 which is adapted to be engaged by the main contact arm 17. A movable contact 42 is rigidly attached to the free end of the resilient member 40. This movable contact 42 is adapted to engage a stationary contact 43, insulatedly attached to the support, during the normal operations of the thermostat 10. The outwardly extending finger-like member 41 extends over the main contact arm 17 and is positioned above the movable contact fastening rivet 44 so as to be engaged thereby as the arm 17 is moved to an extreme upward position by the thermal responsive element 12.

With such an upward movement of the main contact arm 17, the rivet 44 engages the finger 41 and flexes or moves the movable contact 42 in an upward direction, disengaging the movable "over-temperature" contact 42 from the "stationary" "over-temperature" contact 43. This separation from the "over-temperature" contacts deenergizes the temperature signaling means 37, inasmuch as the "under-temperature" contacts and the "over-temperature" contacts are in series circuit relation with said signaling means 37. The deenergization of the signaling means 37 thus indicates that the roaster, or the like, is not operating at or within its predetermined temperature range. The stationary "over-temperature" contact 43 is electrically connected to the movable "under-temperature" contact arm by means of a suitable conductor 45 insulatedly positioned on the support.

By bending or positioning the free end of the "over-temperature" finger 41 with respect to the free end of main contact arm 17 it is possible to determine or adjust the amount of the initial over-shooting of the roaster temperature which would be permissible without deenergizing the temperature signal 37. In other words, if desired, the signal 37 may continue to be energized during the initial over-shooting of the roaster temperature (see dotted line A, Fig. 9), or if desired, the signal may be energized only within the normal temperature range for a given setting of the thermostat (see dotted lines B and C, Fig. 9).

Referring to the accompanying drawings and particularly to the schematic wiring diagram in Fig. 10 it will be noted that as the roaster heating element 24 is connected to the power supply, say, at the normal room temperature, neither the power signal 25 nor the temperature signal 37 will be energized and, inasmuch as the adjusting screw 14 of the thermostat 10 is positioned in an "off" position, the heating element 24 of the roaster structure, or the like, will not be energized. Then, if it be desired to operate the roaster at a predetermined selected temperature value, the operator rotates the adjusting screw 14 to the desired operating temperature. The finger or cam 32 attached to the inner portion of the adjusting screw 14 thus permits closing of the circuit to the power indicating or signaling means 25 so as to indicate that the roaster heating element 24 is being energized. As the temperature of said roaster increases due to the energization of the heating element thereof, the bimetallic element 12 moves in an upward direction carrying the "under-temperature" contact arm 33 upwardly therewith.

Then, just prior to the thermostat and roaster arriving at their predetermined temperature setting the movable "under-temperature" contact 35 engages the "stationary" "under-temperature" contact 36, energizing the temperature signaling means 37 so as to indicate that the roaster is in its predetermined set operating temperature. A continued over-shooting of the roaster temperature continues to move the bimetallic element 12 in an upward direction. The insulating button 16 attached thereto thus, through the cooperation of the "under-temperature" contact arm 33, and the "under-temperature" cooperating contacts 35 and 36, bodily moves the main contact arm 17 upwardly, disengaging the main cooperating contacts 19 and 23 and deenergizing the heating element 24 of said roaster, or the like. The roaster will then continue to be intermittently energized in a normal manner.

If, for any reason whatsoever, as, for example, if the operator should lower the setting of the thermostat, said bimetallic element 12 is moved or moves to a still further upward position, moving the main contact arm 17 further away from the main stationary contact 23, and said arm 17 will engage with the "over-temperature" finger 41, disengaging the "over-temperature" contacts 42 and 43. Inasmuch as the "over- and under-temperature" contacts are in series circuit arrangement with the temperature signaling means 37, said temperature signaling means 37 is deenergized, indicating that the roaster is not at its operating temperature.

However, assuming that the roaster, or the like, decreases in temperature, said thermostatic element 12 will then flex or rotate downwardly, permitting the main contact arm 17 to return to its normal operating position or to a contact-closed position. This permits the "over-temperature" contacts 42 and 43 to be reengaged and thus permits the temperature signaling means 37 to be reenergized, indicating that the roaster is at or within its predetermined temperature range.

It is therefore obvious that I have provided a thermostatic control for a roaster structure, or the like, which, in addition to regulating the temperature thereof, indicates as to whether or not the roaster is connected to a suitable power supply, and indicates as to whether or not the roaster is operating within the preselected temperature zone, as determined by the operator through the adjusting means of the thermostat.

Various modifications may be made in the device embodying my invention without departing from the spirit and scope thereof, and I desire therefore that only such limitation shall be placed thereon as are imposed by the prior art and the appended claim.

I claim as my invention:

An electrically-heated appliance comprising heating means, a temperature indicating signal light, and a thermostatic control for said heating means and said signal light, said control comprising a pair of main contacts controlling said heating means, a pair of under-temperature and a pair of over-temperature contacts connected in series with each other and with said signal light for controlling the light, a movable arm carrying one of said under-temperature contacts and one of said main contacts, a second arm carrying one of said over-temperature contacts, temperature responsive means, the other of said under-temperature contacts being actuated, by said temperature responsive means upon increase in temperature, first into contact with said one under-temperature contact and being effective upon further increase in temperature to move said movable arm to separate the main contacts and, after a further predetermined movement in the same direction, to engage and actuate said second arm to open said over-temperature contacts, and means for adjusting the relative positions of said temperature responsive means and said first arm to vary the temperature setting of the control.

PAUL R. LEE.

REFERENCES CITED

The following references are of record in the file of this patent:

UNITED STATES PATENTS

| Number | Name | Date |
|---|---|---|
| 1,393,968 | Rishel | Oct. 18, 1921 |
| 1,976,587 | Teetor | Oct. 9, 1934 |
| 2,074,569 | Smith | Mar. 23, 1937 |
| 2,151,782 | Lockwood | Mar. 28, 1939 |
| 2,208,432 | Samuels | July 16, 1940 |
| 2,253,553 | Burch | Aug. 26, 1941 |
| 2,278,629 | Winning | Apr. 7, 1942 |
| 2,289,882 | Myers | July 14, 1942 |